United States Patent [19]

Huber

[11] Patent Number: 5,041,748
[45] Date of Patent: Aug. 20, 1991

[54] LIGHTWEIGHT, DIRECT DRIVE ELECTROMECHANICAL ACTUATOR

[75] Inventor: Jeffrey A. Huber, Rockford, Ill.
[73] Assignee: Sundstrand Corporation, Rockford, Ill.
[21] Appl. No.: 422,130
[22] Filed: Oct. 16, 1989
[51] Int. Cl.⁵ .................. H02K 7/06; F16H 29/20
[52] U.S. Cl. ........................... 310/80; 310/83; 192/141; 74/18.2; 74/89.15; 74/424.8 R
[58] Field of Search .............. 74/424.8 R, 18.2, 89.15; 310/80, 83; 192/141

[56] References Cited

U.S. PATENT DOCUMENTS

| | | | |
|---|---|---|---|
| 2,283,476 | 5/1942 | Waibel | 74/424.8 R |
| 2,307,317 | 1/1943 | König | 74/424.8 R |
| 2,918,827 | 12/1959 | Brown | 74/424.8 R |
| 3,161,074 | 12/1964 | Korthaus et al. | 74/424.8 R |
| 3,666,704 | 5/1972 | Paine et al. | 310/80 |
| 3,682,283 | 8/1972 | Sato | 192/141 |
| 4,136,571 | 1/1979 | Frölichsthal | 74/89.15 |
| 4,179,944 | 12/1979 | Conner | 74/424.8 R |
| 4,307,799 | 12/1981 | Zouzoulas | 192/141 |
| 4,560,894 | 12/1985 | Stoll | 310/80 |
| 4,858,481 | 8/1989 | Abraham | 192/141 |

FOREIGN PATENT DOCUMENTS 222452 7/1962 Austria ............... 74/424.8 R
2111635 7/1983 United Kingdom ........... 74/424.8 R

OTHER PUBLICATIONS

Saginaw Steering Gear Division, General Motors Corporation, Sep. 6-16, 1960, pp. 12, 13, 16, 17.

Primary Examiner—Steven L. Stephan
Assistant Examiner—Dennis R. Haszko
Attorney, Agent, or Firm—Antonelli, Terry, Stout & Kraus

[57] ABSTRACT

An actuator (10) comprises a housing having sections (11, 11') joined by a band clamp (12). A high torque, low speed motor (14) is provided in the housing and has a rotor (17) associated with a ballscrew rod (18) which is received in the hollow end of a ballnut/rod (20). The ballscrew rod (18) and the ballnut/rod (20) are provided with grooves (19, 20 respectively) between which ceramic balls (20) are entrained. The rod (20) translates in only a rectilinear direction and the grooves (19) of the ballscrew rod (18) are protected from the environment by the ballnut/rod (20) which covers the free end of the ballscrew rod (18).

19 Claims, 1 Drawing Sheet

LIGHTWEIGHT, DIRECT DRIVE ELECTROMECHANICAL ACTUATOR

TECHNICAL FIELD

The present invention relates to an electromechanical actuator (also abbreviated as "EMA") and, more particularly, to a lightweight electromechanical actuator which is directly driven by a motor in a manner which increases the desirability of using the actuator particularly as an aircraft servo device in hostile environments.

BACKGROUND ART

As aircraft development proceeds towards elimination of many hydromechanical controls in favor of all electric controls, weight reduction in non-electrical control elements becomes of great importance, especially in high performance aircraft which operate at elevated temperatures and altitudes. In the past, actuators for aircraft use have been proposed but were not completely satisfactory from the point of view of simplicity of construction, weight and reliability of operation. In addition, internal stops were used to prevent overstroking, and these stops determined the sizing of the other actuator parts.

Electromechanically actuated devices of a general nature are also well known. In conventional actuators, the ballnut typically remained stationary, and the ballscrew stroked back and forth by virtue of an arrangement of an actuating motor through a gear train. However, this arrangement was disadvantageous because the gear train multiplied the inertia torque of the motor by the square of the gear ratio. The inertia torque of stopping the motor very quickly (i.e., hitting the stops) was thus very high and required the actuator to be built with greater strength and weight.

The ball-screw linear actuator in U.S. Pat. No. 3,660,704 is a more compact linear actuator intended for spacecraft use. However, this device was not particularly lightweight. It achieved some compactness by mounting the motor on the ball nut but is not concerned with an arrangement which minimizes the need for a stiff, heavier housing. The housing requires an end plate or access cover at one end and a plurality of studs or bolts arranged in screw-threaded openings on mating flanges. A motor is arranged within the housing for driving a coupling in the form of a nut in a recirculating ball load screw assembly. A linear transducer extended into one end of the shaft continuously monitors the position of the shaft.

Actuators for a variety of other uses were also known. U.S. Pat. No. 3,161,074 describes an electromotive adjusting device primarily designed for an automatic opening or closing of mine ventilator doors. The device mounted a motor rotor directly on the ball nut and contained assorted springs, brakes, rotor locking and the like specific to the needs of mine door applications. It uses the rotary movement of a rotor to effect axial reciprocating movement of the rod. The nut is connected to and rotated with the rotor, and the screw then rotates to cause axial and rotary motion of the output of the ball screw.

U.S. Pat. No. 4,136,571 relates to a manure disposer installation in which an electric motor had a fixed stator and a rotor which was attached to a hollow cylinder on the interior of which is fixedly secured a threaded nut. The device drives a connecting rod to which manure shovers are attached to move to and from over a surface. A motor rotor is mounted on the nut rather than arranged to direct drive the ballscrew. The motor rotor has a hollow cylinder in which a spindle nut is fixed and is connected closely with a hollow cylinder. The spindle nut is threadably associated with a spindle so that the spindle is moved according to the rotating direction of the spindle nut in one of two axial directions of the hollow cylinder. This installation is not concerned with the problems of size and weight normally associated with actuators for use in environments where space and weight limitations are important such as, for example, in aircraft applications.

The prior art also is not concerned with how the actuator could lend itself to more modern manufacturing techniques such as composite manufacturing methods which allow the actuator to be lighter and yet used in more hostile environments, or how an actuator could be produced which avoided high inertia torque and thereby allowed for quick and accurate movement of the actuator.

DISCLOSURE OF THE INVENTION

It is an object of the present invention to overcome the problems and disadvantages encountered in prior art actuators.

It is an object of the present invention to provide a lightweight, hostile environment electromechanical actuator.

It is another object of the present invention to provide a lightweight and compact actuator by virtue of a motor directly driving a ballscrew assembly.

It is yet another object of the present invention to provide a reliable actuator drive using a switched reluctance motor or any other motor directly driving, i.e. without the presence of a gear train, a hybrid steel/composite/ceramic ballscrew.

It is a further object of the present invention to provide an actuator in which the ballnut/rod only translates to avoid transmitting torque into the rod end and into a device mated to the rod.

It is still a further object of the present invention to protect the ballscrew from the environment in which the actuator is used by means of the ballnut/rod, thereby increasing reliability and life of the actuator.

It is another object of the present invention to provide an actuator design which lends itself to simplified packaging and to the use of advanced materials to achieve weight reduction on the order of at least 20% over conventional actuators.

The foregoing objects to provide a more compact, lightweight actuator whose operation has been greatly simplified have been achieved in part by the recognition that, in using a larger motor connected directly to the actuator without a gear train, the overall package can be made smaller and lighter and thus be amenable to manufacturing techniques utilizing modern materials.

By eliminating the gear train, the actuator housing in accordance with the present invention can have a cylindrical shape which produces a more compact envelope and lends itself to filament wound composite manufacturing methods. A removable band clamp can be used to join two composite halves together, thereby eliminating problems associated with fasteners which have to be embedded in a composite structure.

The rotor construction of the present invention is lightweight and of low inertia. This arrangement reduces the loading into the drive train if the actuator hits the internal stops and increases the actuator frequency response.

The ballscrew and rotor can be constructed of steel. The rotor is required to be made of a ferrous material to conduct the magnetic flux induced in the rotor. The rotor poles themselves are typically made by pressing laminations onto the rotor shaft. The ballscrew end of the shaft can be carburized, hardened and then chrome plated.

High compressive strength and temperature resistant ceramic balls can be used in the ballscrew/ball nut interface. Three independent, double row circuits of balls can be used to provide redundancy and to prevent backlash.

The rod/ball nut is a steel and composite hybrid. The ball tracks and ball returns are machined into a steel sleeve. The sleeve is encapsulated into a composite filament wound rod, and the rod end fitting is also wound into the rod structure during filament winding.

The motor rotor of the present invention is in one embodiment of the present invention one piece with the ballscrew, and the ballscrew mates with a ball nut integral with an actuating rod for effecting translation. Another feature of the present invention is the driving of the ball screw within the ball nut which, as a result, translates in and out in a rectilinear direction and avoids exposure of the ballscrew to the outside environment.

As a result, the rod/ball nut translates only and does not rotate. This eliminates the need to transmit torque into the rod end and into the mating device.

The screw is protected from the environment by the translating rod, thereby increasing reliability and life of the device. This feature allows the ball nut to glide in and out of the housing on bushings or rectilinear bearings to provide a good seal interface. Consequently, the ball screw is sealed from the environment and, in bending loads due to vibration are transferred directly to the housing. This allows the ball screw only to deal with compression/tension loads and torsional loads without the need for dealing with bending loads.

The ball nut/rod and housing in accordance with the present invention has cooperating shoulders associated therewith to provide positive, non-jamming travel stops. Because rotational inertia is minimized and motor speed is relatively low, stop loads due to motor inertia are also minimized.

The outside diameter of the rod/ball nut glides through bushings and a seal mounted in a composite end housing.

By the arrangement of the motor rotor, ballscrew and rod/ball nut, the gear train is eliminated and the response of the actuator is increase with a consequent reduction in backlash.

The cylindrical shape of the housing lends itself to a filament winding composite construction which produces a high stiffness to weight ratio. This also means that the natural frequency will be raised, and the rigidity allows it to survive MIL spec requirements for engine mounted equipment. For example, a graphite/polymide composite can be used so as to meet the requirements of strength, ambient heat and motor heat dissipation requirements. The rod end bearing is wound into the housing and a clamp is used at the housing split line to avoid the problems inherent in bolt/composite interfaces.

A slot in the rod is used to prevent rotation of the ball nut/rod. A feedback transducer runs within the slot to provide anti-rotation and is either a proximity probe or optical sensor. The bottom of the anti-rotation slot is tapered such that the slot is deeper at one end than it is at the other end. Thus, coarse position feedback and anti-rotation are both provided by the same mechanism. It will be appreciated that this method also lends itself well to an optical feedback approach such as the same technology which is used to do bar code scanning. This scanning method provides sufficient accuracy to serve as the lone feedback mechanism.

More precise position feedback to augment the proximity probe provided by two wheels mounted at the back of the rotor, one wheel having finer teeth than the other wheel which can also be used to generate a rotor position feedback signal. The wheels also lend themselves to an optical sensing method, with the teeth on the wheel replaced by black and white strips arranged in such a fashion as to provide a one per revolution repeating rotor position signal.

The SR motor permits high torque design and a small package thereby allowing direct drive of the ball screw and eliminating the spur gear train common to most electromechanical actuators. Elimination of the drive train also reduces overall actuator weight.

Furthermore, use of an SR motor simplifies the power electronics required in the controller. The conventional push-pull inverter drive of a permanent magnet, brushless d.c. motor is not required because a simple single polarity synthesized AC waveform can be used to drive the SR motor. The SR motor is run with a series of single polarity square wave pulses, and the number of transistors necessary to generate such a signal is three times less than the number required to generate a synthesized AC wave form. A simple single polarity square wave pulse requires only two power transistors as opposed to the six major power transistors normally required to generate a four step synthesized waveform.

Because the rotor and ball screw are formed as one piece, this construction has the advantage that it greatly reduces rotating inertia as well as the complexity of the housing.

Another advantage of the present invention is that the direct drive ball screw routes actuator loads directly to ground. As a result, the strength requirements of the housing can be minimized without adversely affecting longitudinal stiffness.

An advantage of the present invention is that the actuator uses a low speed, high torque motor such as a the switched reluctance motor resulting in a combination of a very low rotational inertia and low rotor speeds which improves the actuator frequency response and virtually eliminates backlash and hysterisis. It is well known that a switched reluctance motor does not use any permanent magnets. It is a high torque motor in which magnet strength degradation or permanent demagnetization at elevated temperatures is not a concerned. The temperature limits for the SR motor are determined by the insulation system used, and an embodiment of the present invention contemplates the use of high temperature insulation.

BRIEF DESCRIPTION OF THE DRAWING

These and other objects, advantages and features of the present invention will become more apparent from the following description when taken in conjunction with the sole FIGURE which is a partial cross-section view showing essential details of the electromagnetic actuator in accordance with the present invention.

BEST MODE FOR CARRYING OUT THE INVENTION

Figure 1:
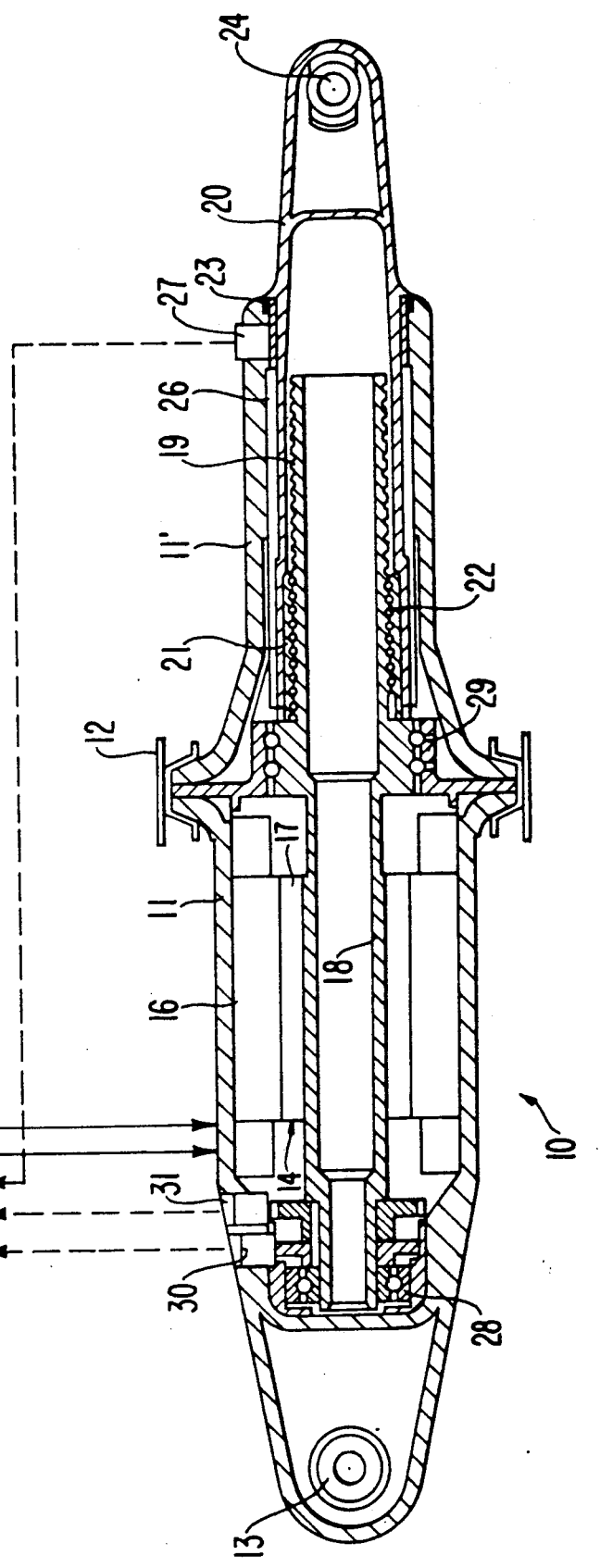

Referring now to the sole FIGURE, there is shown an actuator designated generally by the numeral 10 having a generally cylindrical housing comprising two parts 11, 11' connected at the joint therebetween by a conventional band clamp 12 such as a Marmon-style clamp or the like. Because the housing is symmetrical and, in this embodiment, generally cylindrical, the sections 11, 11' can be constructed from filament-wound composites or similar materials which provide a significant weight reduction without sacrificing the strength or stiffness of the housing. As a result of a higher stiffness to weight ratio, the natural frequency of the actuator 10 is also raised and allows it to be used for engine mounted equipment where vibration is a significant concern. By way of example, graphite/polymide is a suitable candidate as a composite material for the housing sections 11, 11'. An end bearing 13 can be wound into the housing section 11 for fixing the actuator 10 to a structure. The band clamp 12 at the split-line or joint of the housing sections 11, 11' avoids problems that might otherwise occur by trying to join composites with bolts, such as with protruding flanges.

A motor 14 such as a switched reluctance (SR) motor is provided in the housing section 11 to power the stroke of the actuator 10 as hereinafter described. In particular, the SR motor 14 can be a dual channel, d.c. motor whose operation is controlled by an engine computer via an electronic controller 15. The motor 14 is designed to provide high torque at low rotational speeds so as to improve the frequency response of the actuator and substantially reduce backlash and hysterisis. Excitation of the motor stator 16 through the electronic controller 15 causes the motor rotor 17 or ballscrew 18 to rotate the ballscrew rod 18.

The motor 14 can be run with a series of single polarity square wave pulses. A single polarity square wave pulse requires only two power transistors (the motor control circuitry not being shown). This arrangement requires only two power transistors in contrast to the six transistors normally required to generate a synthesized waveform in a permanent magnet, brushless d.c. motor with a conventional push-pull inverter drive.

The motor rotor 17 can be constituted as one piece with the ballscrew rod 18. The ballscrew rod 18 extends into the interior of but, in the illustrated embodiment, not beyond the housing section 11' and is provided with a ballscrew grooves 19 at the portion within the housing section 11'. The ballscrew rod can also extend to the outside of the housing without departing from the scope of the present invention. A hollow ballnut/rod 20 extends over the end of the ballscrew 18 has similar grooves 21 so that recirculating balls 22 which can be made of ceramic are entrained between the grooves 19, 21 of the ballscrew 11, ballnut/rod 20, respectively, to transmit the rotary motion of the rotor 17 and ballscrew 18 to the ballnut/rod 20 and to effect motion of the rod 20 in a rectilinear direction. The outer diameter of the ballnut/rod 20 glides through conventional bushings 23 and a seal mounted in the composite end housing. Conventional non-jamming stops can be provided at the ends of the ball nut/rod 20 and of the housing section 11' in a known manner to assure that the actuated system (not shown) does not suffer over-actuation and possible failure as a result thereof, i.e. overstroking. An end bearing 24 can be provided in the end of the rod 20 for joining the actuator 10 to the actuated system, such as an engine control or flight surface, which requires rapid and accurate actuation with sufficient force from the high torque motor 14.

The ballnut/rod 20 is intended only to translate and does not rotate. To effect this non-rotating linear motion, a slot 26 can be provided in the outer surface of the rod 20 so as to cooperate with a key fixed in the housing section 11' which in the illustrated embodiment is also a stationary feedback transducer 27 which feeds absolute positive signals to the electronic controller 15 for actuating the motor 14. However, an optical probe can be used in lieu of the feedback transducer without departing from the present invention. No torque is therefore transmitted into the end of the rod 20 and the system mated thereto at the bearing 24.

The ballscrew-ballnut arrangement protects the ballscrew rod 18 from the environment by its location inside the rectilinear translating rod 20, thereby increasing its reliability and life even when the actuator is used in hostile environments where small, foreign particles can destroy the smooth operation of conventional ballscrew-ballnut arrangements. The gear train used in conventional actuators to connect high speed motors has been eliminated to thereby increase the response of the actuator and to reduce backlash. This arrangement also saves weight because conventional ballscrew actuators, such as an inlet guide vane EMA, react side loads and vibration loads through the ballscrew and therefore require extra bending strength. The present invention allows the side loads to be reacted through the rod 20 and the housing sections 11, 11', thereby permitting the ballscrew to be a more lightweight tension/compression member.

Because of the concealed arrangement of the ballscrew and ballnut, the rod 18 can even extend outside of the housing of the actuator 10 without any concern that the grooves will pick up foreign objects and destroy the frictionless movement between the shaft 18 and the rod 20.

Ceramic bearings 28 and duplex ceramic bearings 29 can also be provided for the ballscrew rod 18 to rotate with minimum friction and to reduce the weight of conventional steel bearings by about 60% in addition to having extremely high temperature capability and minimum lubrication requirements. Incremental position feedback and motor control functions are provided by the magnetic pickups 30, 31 adjacent the motor 14 to provide coarse and fine position signals. A full actuator stroke can be achieved with, for example, twenty rotor revolutions. The position of the motor rotor 17 is provided by the fine position signal magnetic pickup and is provided to the controller 15 which uses that information to communicate the SR motor 14 and accurately position the actuator 10. Alternatively, instead of the fine position signal, motor reluctance can be sensed to provide the necessary signal.

While an embodiment has been shown and described in accordance with the present invention, it should be clearly understood that the same is susceptible to numerous changes and modifications. Therefore, it is not intended that the invention be limited to the details shown and described herein but is intended to cover all changes and modifications as are encompassed by the scope of the appended claims.

I claim:

1. An actuator, comprising a housing, a motor operatively arranged within the housing and directly driving a shaft located at least partly within the housing, a first coupling means on an outer surface of the shaft axially displaced from the motor, and a rod movable into and out of the housing for transmitting loads, the rod having a hollow portion and a second coupling means associated with the hollow portion of the rod which cooperates with the first coupling means within the housing so that the first and second coupling means are not exposed, and the housing is a multipart housing joined by at least one removable band clamp.

2. An actuator, comprising a multipart housing joined by at least on removable band damp, a motor operatively arranged within the housing and directly driving a shaft located at least partly within the housing, a first coupling means on an outer surface of the shaft axially displaced from the motor, and a rod movable into and out of the housing for transmitting loads, the rod having a hollow portion and a second coupling means associated with the hollow portion of the rod which cooperates with the first coupling means within the housing, the motor has a rotor unitary with the shaft; and the first coupling means, and the second coupling means comprise a ballscrew and ballnut, and balls are operatively arranged between the first and second coupling means.

3. An actuator, comprising a housing, a motor operatively arranged within the housing and directly driving a shaft located at least partly within the housing, a first coupling means on an outer surface of the shaft axially displaced from the motor, and a rod movable into and out of the housing for transmitting loads, the rod having a hollow portion and a second coupling means associated with the hollow portion of the rod which cooperates with the first coupling means within the housing and at least one feedback device provides a signal responsive to position of the rod relative to the housing and the feedback device includes a means to prevent rotation of the rod relative to the housing.

4. An actuator, comprising a housing, a motor operatively arranged within the housing and directly driving a shaft located at least partly within the housing, a first coupling means on an outer surface of the shaft axially displace from the motor, and a rod movable into and out of the housing for transmitting loads, the rod having a hollow portion and a second coupling means associated with the hollow portion of the rod which cooperates with the first coupling means within the housing, means for providing incremental feedback, a motor control adjacent the motor, at least one feedback device providing a signal responsive to the position of the rod relative to the housing, and the feedback device includes a means to prevent rotation of the rod relative to the housing.

5. An actuator, comprising a housing, a motor operatively arranged within the housing and directly driving a shaft located at least partly within the housing, a first coupling means on an outer surface of the shaft axially displaced from the motor, and a rod movable into and out of the housing for transmitting loads, the rod having a hollow portion and a second coupling means associated with the hollow portion of the rod which cooperates with the first coupling means within the housing, and the housing is a multipart housing with each part being constructed form a composite material with at least one split line separating the parts with each split line being joined by a clamp.

6. An actuator in accordance with claim 5 wherein:
the composite material comprises a graphite and polyamide.

7. An actuator in accordance with claim 5 wherein:
the clamp comprises a band clamp.

8. An actuator in accordance with claim 6 wherein:
the clamp comprises a band clamp.

9. An actuator in accordance with claim 5 wherein:
the first coupling means and the second coupling means comprise a ballscrew and ballnut, and balls are operatively arranged between the first and second coupling means.

10. An actuator in accordance with claim 5 further comprising:
at least one feedback device providing a signal responsive to the position of the rod relative to the housing and the feedback device including a means to prevent rotation of the rod relative to the housing.

11. An actuator in accordance with claim 2 wherein:
the motor is a switched reluctance motor.

12. An actuator according to claim 1, wherein the first coupling means and and ballnut, the second coupling means comprise a ballscrew and ballnut, and balls are operatively arranged between the first and second coupling means.

13. An actuator according to claim 1, wherein the motor is a switched reluctance d.c. motor and has a rotor unitary with the shaft.

14. An actuator according to claim 3, wherein the first coupling means and the second coupling means comprise a ballscrew and ballnut, and balls are operatively arranged between the ballscrew and the ballnut.

15. An actuator according to claim 14, wherein the motor is a switched reluctance d.c. motor and has a rotor unitary with the shaft.

16. An actuator according to claim 15, wherein the housing is a multipart housing joined by at least one removable band clamp.

17. An actuator to claim 16, wherein the rod is configured to prevent rotation thereof with respect to the housing.

18. An actuator according to claim 4, wherein the first coupling means and the second coupling means comprise a ballscrew and ballnut, and balls are operatively arranged between the ballscrew and the ballnut 19. An actuator according to claim 4, wherein the motor is a switched reluctance d.c. motor and has a rotor unitary with the shaft.

* * * * *